US012672112B2

(12) United States Patent
Guo et al.

(10) Patent No.: US 12,672,112 B2
(45) Date of Patent: Jun. 30, 2026

(54) VEHICLE-TO-ANYTHING RESOURCE SELECTION

(71) Applicant: QUALCOMM Incorporated, San Diego, CA (US)

(72) Inventors: Hui Guo, Beijing (CN); Tien Viet Nguyen, Bridgewater, NJ (US); Wanshi Chen, San Diego, CA (US); Kapil Gulati, Belle Mead, NJ (US); Sourjya Dutta, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 18/555,832

(22) PCT Filed: Jul. 1, 2021

(86) PCT No.: PCT/CN2021/103954
§ 371 (c)(1),
(2) Date: Oct. 17, 2023

(87) PCT Pub. No.: WO2023/272673
PCT Pub. Date: Jan. 5, 2023

(65) Prior Publication Data
US 2024/0205885 A1      Jun. 20, 2024

(51) Int. Cl.
H04W 4/00          (2018.01)
H04B 17/318        (2015.01)
(Continued)

(52) U.S. Cl.
CPC .......... H04W 72/02 (2013.01); H04B 17/328 (2023.05); H04W 72/40 (2023.01); H04W 72/51 (2023.01)

(58) Field of Classification Search
CPC ..... H04W 72/02; H04W 72/51; H04W 72/40; H04W 72/52
See application file for complete search history.

(56) References Cited

U.S. PATENT DOCUMENTS

| | | |
|---|---|---|
| 2021/0014656 A1 | 1/2021 | Mueck et al. |
| 2021/0051527 A1 | 2/2021 | Baghel et al. |

(Continued)

FOREIGN PATENT DOCUMENTS

| | | |
|---|---|---|
| WO | 2020063925 A1 | 4/2020 |

OTHER PUBLICATIONS

International Search Report and Written Opinion—PCT/CN2021/103954—ISA/EPO—Mar. 29, 2022.
(Continued)

*Primary Examiner* — Shantell L Heiber
(74) *Attorney, Agent, or Firm* — Harrity & Harrity, LLP

(57) ABSTRACT

Various aspects of the present disclosure generally relate to wireless communication. In some aspects, a mobile station may select a vehicle-to-anything (V2X) resource from a resource pool partitioned between New Radio (NR) V2X resources and Long Term Evolution (LTE) V2X resources if an NR V2X traffic parameter does not satisfy a traffic threshold, or from a non-partitioned resource pool if the NR V2X traffic parameter satisfies the traffic threshold. The mobile station may transmit a V2X communication in the V2X resource. Numerous other aspects are described.

26 Claims, 11 Drawing Sheets

800 ⟶

810 — Select, by the mobile station, a vehicle-to-anything (V2X) resource from a resource pool partitioned between New Radio (NR) V2X resources and LTE V2X resources if an NR V2X traffic parameter does not satisfy a traffic threshold, or from a non-partitioned resource pool if the NR V2X traffic parameter satisfies the traffic threshold 820 — Transmit, by the mobile station, a V2X communication in the V2X resource

(51) Int. Cl.

| | |
|---|---|
| *H04W 72/02* | (2009.01) |
| *H04W 72/40* | (2023.01) |
| *H04W 72/51* | (2023.01) |

(56) References Cited

U.S. PATENT DOCUMENTS

| | | | |
|---|---|---|---|
| 2021/0160890 A1* | 5/2021 | Selvanesan | H04W 72/542 |
| 2021/0219299 A1* | 7/2021 | Peng | H04W 4/40 |
| 2022/0104055 A1* | 3/2022 | Wahaj Arshad | H04W 24/10 |

OTHER PUBLICATIONS

LG Electronics: "Discussion on Sidelink Resource Allocation Mechanism", 3GPP Draft, 3GPP TSG RAN WG1 Meeting #94, R1-1808522 Discussion on Sidelink Resource Allocation Mechanism LG, 3rd Generation Partnership Project (3GPP), Mobile Competence Centre, 650, Route Des Lucioles, F-06921 Sophia-Antipolis Cedex, France, RAN WG1, No. Gothenburg, Sweden, Aug. 20, 2018-Aug. 24, 2018, Aug. 11, 2018 (Aug. 11, 2018), XP05151590, 4 Pages, p. 3 Paragraph 1, Section 2.3.

OPPO: "Discussion on Coexistence in NR-V2X", 3GPP Draft, 3GPP TSG-RAN WG1 Meeting #95, R1-1812830, Spokane, USA, Nov. 12-16, 2018, pp. 1-4, p. 3, Paragraph 1, Section 2.1.

Samsung: "LTE-NR Coexistence for UL", 3GPP Draft, 3GPP TSG RAN WG1 Meeting #88, R1-1703011, Athens, Greece, Feb. 13-17, 2017, pp. 1-8, Section 2.1, Paragraph 2, Figure 1.

Zte, et al., "Summary of [105bis#31][NR/V2X] Resource Pool Configuration and Selection (ZTE)", 3GPP Draft, R2-1906495, 3GPP TSG-RAN WG2 #106, Reno, USA, May 13-17, 2019, 18 Pages, p. 13.

OPPO: "Discussions on NR and LTE V2X in-device Coexistence", 3GPP TSG-RAN WG1 Meeting #96bis, R1-1904923 Coexistence, 3GPP, Mobile Competence Centre, 650, Route Des Lucioles, F-06921 Sophia-antipolis Cedex, France, vol. RAN WG1, No. Xi'an, China, Apr. 8, 2019-Apr. 12, 2019, Apr. 2, 2019, XP051707344, 4 Pages, p. 3, paragraph 2.1.

Supplementary European Search Report—EP21947626—Search Authority—The Hague—Jan. 29, 2025.

* cited by examiner

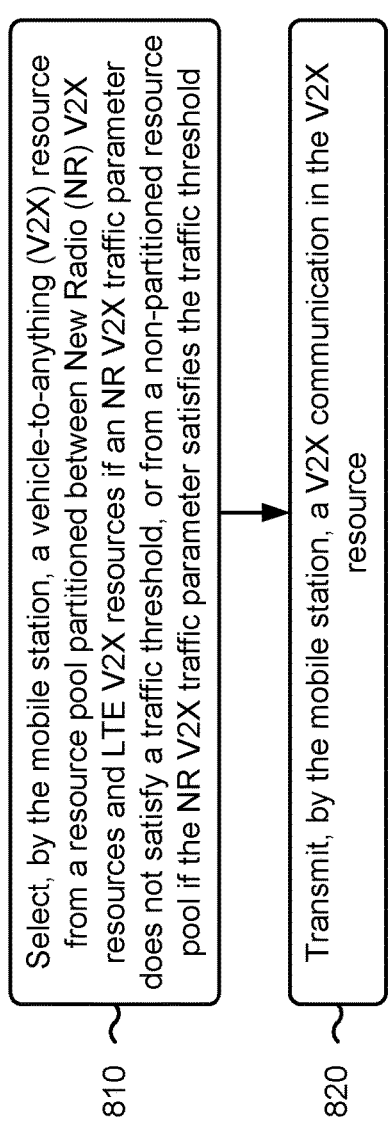

Select, by the mobile station, a vehicle-to-anything (V2X) resource from a resource pool partitioned between New Radio (NR) V2X resources and LTE V2X resources if an NR V2X traffic parameter does not satisfy a traffic threshold, or from a non-partitioned resource pool if the NR V2X traffic parameter satisfies the traffic threshold

820

Transmit, by the mobile station, a V2X communication in the V2X resource

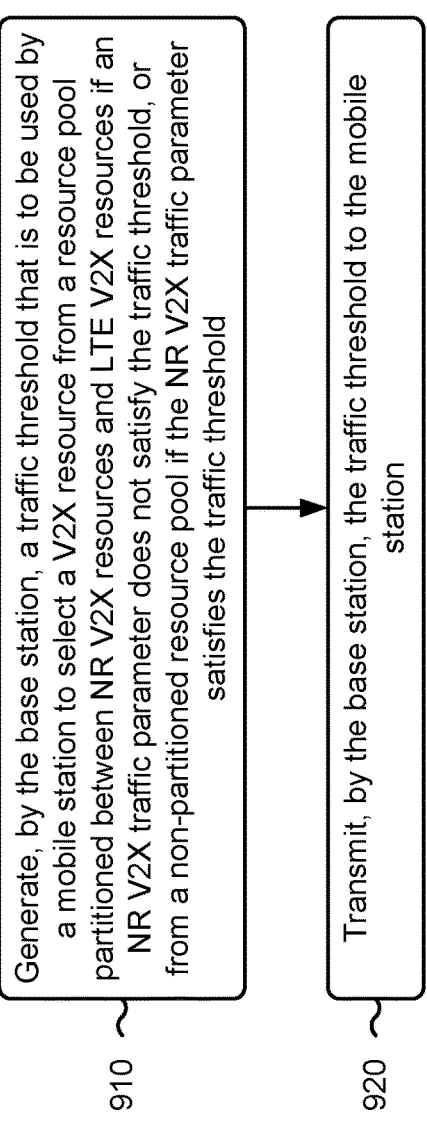

Generate, by the base station, a traffic threshold that is to be used by a mobile station to select a V2X resource from a resource pool partitioned between NR V2X resources and LTE V2X resources if an NR V2X traffic parameter does not satisfy the traffic threshold, or from a non-partitioned resource pool if the NR V2X traffic parameter satisfies the traffic threshold

910

Transmit, by the base station, the traffic threshold to the mobile station

VEHICLE-TO-ANYTHING RESOURCE SELECTION

CROSS-REFERENCE TO RELATED APPLICATION

This patent application is a 371 national stage of PCT Application No. PCT/CN2021/103954 filed on Jul. 1, 2021, entitled "VEHICLE-TO-ANYTHING RESOURCE SELECTION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for selecting vehicle-to-anything resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a mobile station. The method may include selecting, by the mobile station, a vehicle-to-anything (V2X) resource from a resource pool partitioned between New Radio (NR) V2X resources and Long Term Evolution (LTE) V2X resources if an NR V2X traffic parameter does not satisfy a traffic threshold, or from a non-partitioned resource pool if the NR V2X traffic parameter satisfies the traffic threshold. The method may include transmitting, by the mobile station, a V2X communication in the V2X resource.

Some aspects described herein relate to a method of wireless communication performed by a base station. The method may include generating, by the base station, a traffic threshold that is to be used by a mobile station to select a V2X resource from a resource pool partitioned between NR V2X resources and LTE V2X resources if an NR V2X traffic parameter does not satisfy the traffic threshold, or from a non-partitioned resource pool if the NR V2X traffic parameter satisfies the traffic threshold. The method may include transmitting, by the base station, the traffic threshold to the mobile station.

Some aspects described herein relate to a mobile station for wireless communication. The mobile station may include a memory and one or more processors coupled to the memory. The one or more processors may be configured to select a V2X resource from a resource pool partitioned between NR V2X resources and LTE V2X resources if an NR V2X traffic parameter does not satisfy a traffic threshold, or from a non-partitioned resource pool if the NR V2X traffic parameter satisfies the traffic threshold. The one or more processors may be configured to transmit a V2X communication in the V2X resource.

Some aspects described herein relate to a base station for wireless communication. The base station may include a memory and one or more processors coupled to the memory. The one or more processors may be configured to generate a traffic threshold that is to be used by a mobile station to select a V2X resource from a resource pool partitioned between NR V2X resources and LTE V2X resources if an NR V2X traffic parameter does not satisfy the traffic threshold, or from a non-partitioned resource pool if the NR V2X traffic parameter satisfies the traffic threshold. The one or more processors may be configured to transmit the traffic threshold to the mobile station.

Some aspects described herein relate to a non-transitory computer-readable medium that stores a set of instructions for wireless communication by a mobile station. The set of instructions, when executed by one or more processors of the mobile station, may cause the mobile station to select a V2X resource from a resource pool partitioned between NR V2X resources and LTE V2X resources if an NR V2X traffic parameter does not satisfy a traffic threshold, or from a non-partitioned resource pool if the NR V2X traffic parameter satisfies the traffic threshold. The set of instructions, when executed by one or more processors of the mobile station, may cause the mobile station to transmit a V2X communication in the V2X resource.

Some aspects described herein relate to a non-transitory computer-readable medium that stores a set of instructions for wireless communication by a base station. The set of instructions, when executed by one or more processors of the base station, may cause the base station to generate a traffic threshold that is to be used by a mobile station to select a V2X resource from a resource pool partitioned between NR V2X resources and LTE V2X resources if an NR V2X traffic parameter does not satisfy the traffic threshold, or from a non-partitioned resource pool if the NR V2X traffic parameter satisfies the traffic threshold. The set of instructions, when executed by one or more processors of the base station, may cause the base station to transmit the traffic threshold to the mobile station.

Some aspects described herein relate to an apparatus for wireless communication. The apparatus may include means for selecting a V2X resource from a resource pool partitioned between NR V2X resources and LTE V2X resources if an NR V2X traffic parameter does not satisfy a traffic threshold, or from a non-partitioned resource pool if the NR V2X traffic parameter satisfies the traffic threshold. The apparatus may include means for transmitting a V2X communication in the V2X resource.

Some aspects described herein relate to an apparatus for wireless communication. The apparatus may include means for generating a traffic threshold that is to be used by a mobile station to select a V2X resource from a resource pool partitioned between NR V2X resources and LTE V2X resources if an NR V2X traffic parameter does not satisfy the traffic threshold, or from a non-partitioned resource pool if the NR V2X traffic parameter satisfies the traffic threshold. The apparatus may include means for transmitting the traffic threshold to the mobile station.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a mobile station, in accordance with the present disclosure.

FIG. 9 is a diagram illustrating an example process performed, for example, by a base station, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
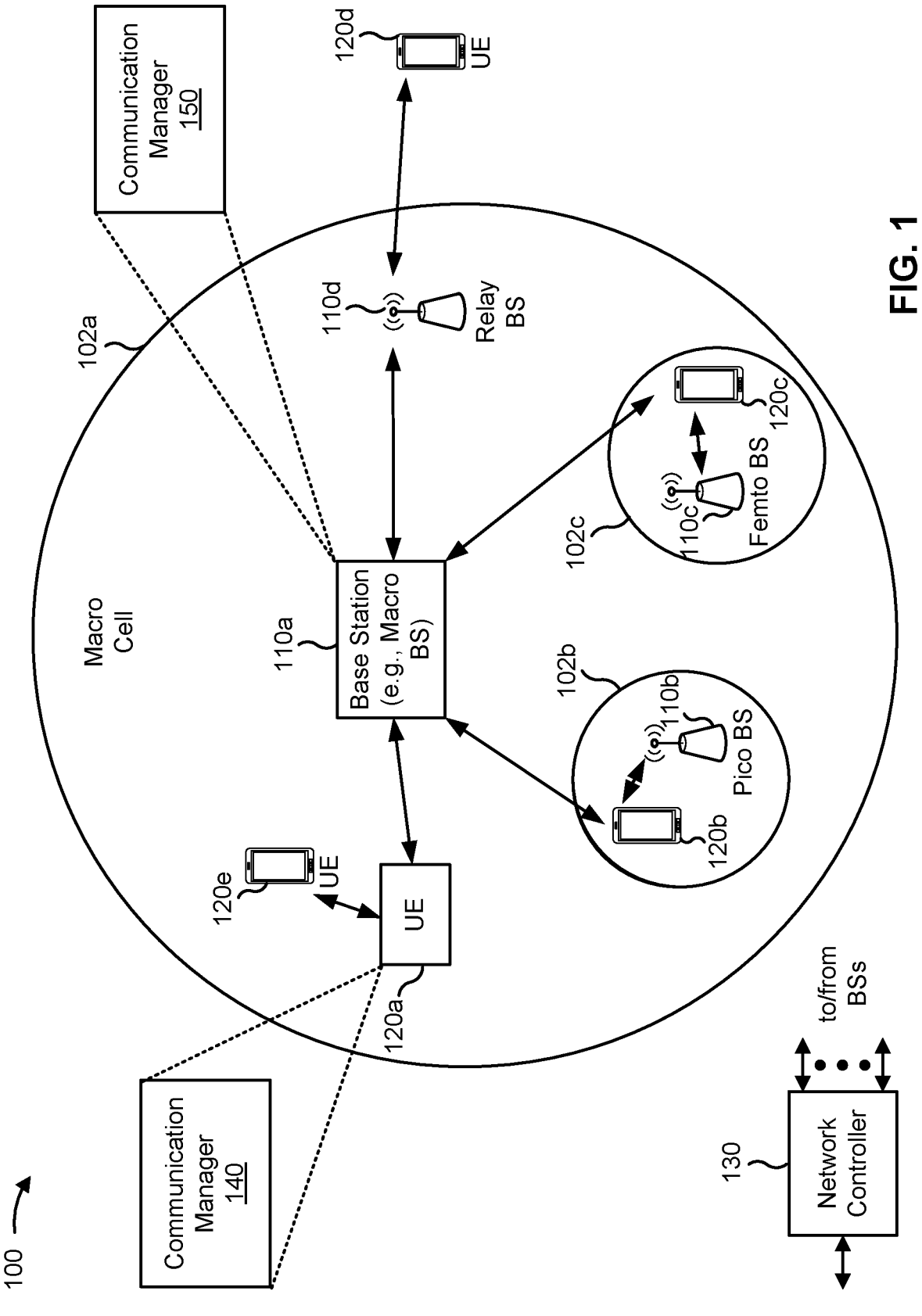
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a mobile station such as a user equipment (UE) 120, or multiple mobile stations such as UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a mobile station (e.g., a UE 120) may include a communication manager 140. As described in more detail elsewhere herein, the communication manager 140 may select a V2X resource from a resource pool partitioned between NR V2X resources and LTE V2X resources if an NR V2X traffic parameter does not satisfy a traffic threshold, or from a non-partitioned resource pool if the NR V2X traffic parameter satisfies the traffic threshold. The communication manager 140 may transmit a V2X communication in the V2X resource. Additionally, or alternatively, the communication manager 140 may perform one or more other operations described herein.

In some aspects, the base station 110 may include a communication manager 150. As described in more detail elsewhere herein, the communication manager 150 may generate a traffic threshold that is to be used by a mobile station to select a V2X resource from a resource pool partitioned between NR V2X resources and LTE V2X resources if an NR V2X traffic parameter does not satisfy the traffic threshold, or from a non-partitioned resource pool if the NR V2X traffic parameter satisfies the traffic threshold; and transmit the traffic threshold to the mobile station. Additionally, or alternatively, the communication manager 150 may perform one or more other operations described herein.

As indicated above, FIG. 1 is provided as an example. Other examples may differ from what is described with regard to FIG. 1.

Figure 2:
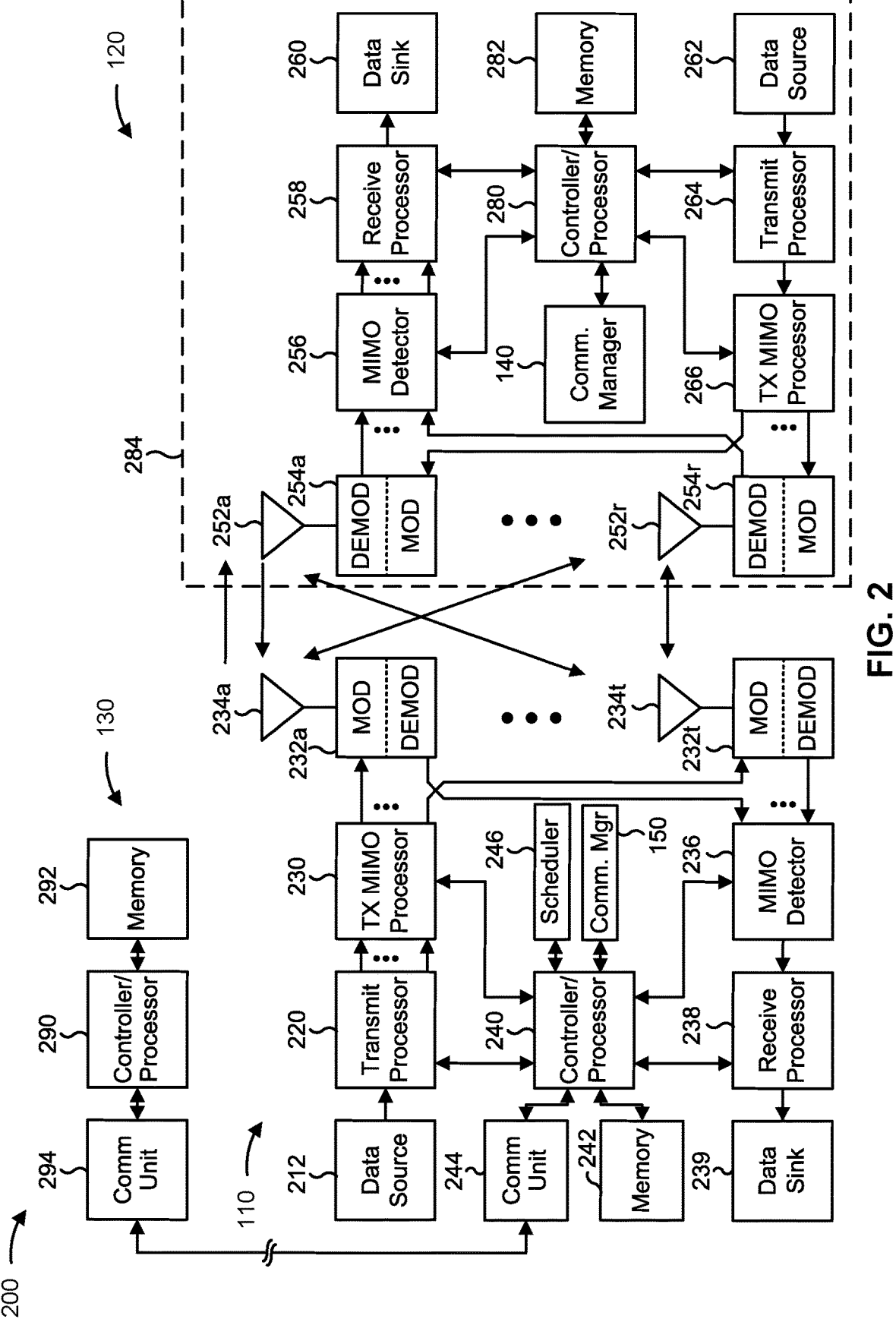
FIG. 2 is a diagram illustrating an example of a base station in communication with a user equipment (UE) in a wireless network, in accordance with the present disclosure.

FIG. 2 is a diagram illustrating an example 200 of a base station 110 in communication with a mobile station (e.g., UE 120) in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 1-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 1-11).

The controller/processor 240 of the base station 110, a controller/processor of a mobile station (e.g., the controller/processor 280 of the UE 120), and/or any other component(s) of FIG. 2 may perform one or more techniques associated with selecting V2X resources, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a mobile station (e.g., a UE 120) includes means for selecting, by the mobile station, a V2X resource from a resource pool partitioned between NR V2X resources and LTE V2X resources if an NR V2X traffic parameter does not satisfy a traffic threshold, or from a non-partitioned resource pool if the NR V2X traffic parameter satisfies the traffic threshold, and/or means for transmitting, by the mobile station, a V2X communication in the V2X resource. In some aspects, the means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for generating, by the base station, a traffic threshold that is to be used by a mobile station to select a V2X resource from a resource pool partitioned between NR V2X resources and LTE V2X resources if an NR V2X traffic parameter does not satisfy the traffic threshold, or from a non-partitioned resource pool if the NR V2X traffic parameter satisfies the traffic threshold; and/or means for transmitting, by the base station, the traffic threshold to the mobile station. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
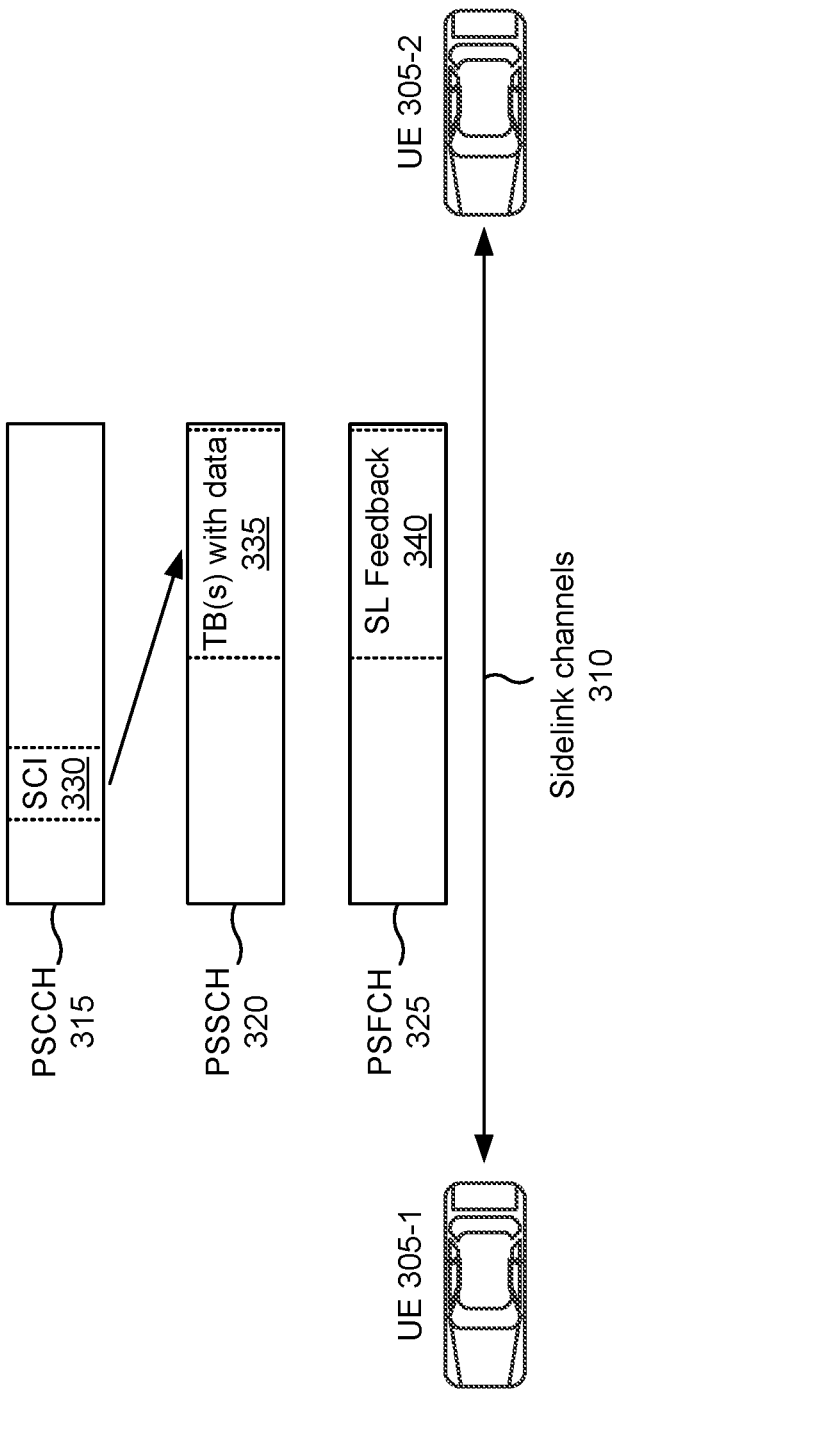
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may be located in vehicles and may communicate using the one or more sidelink channels 310 for V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate/ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
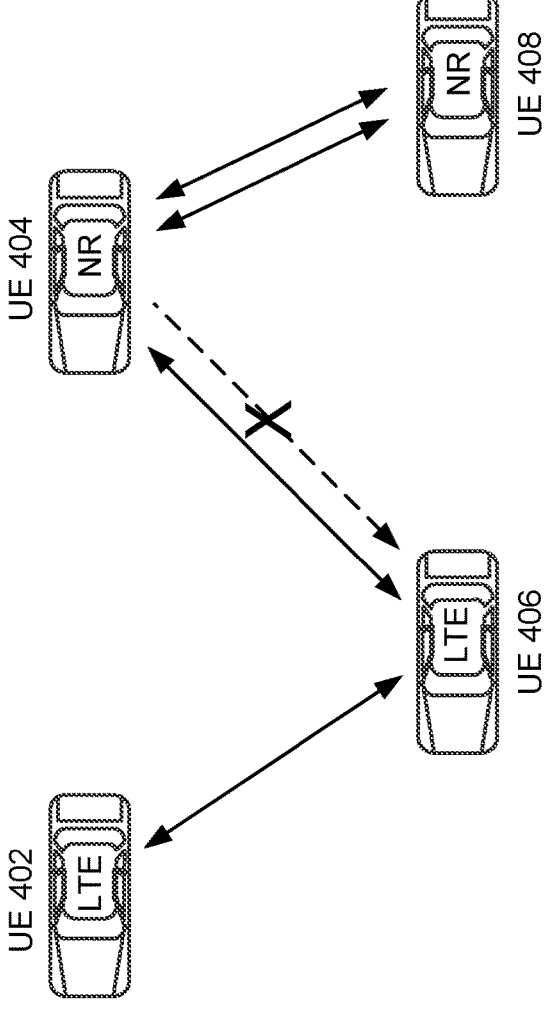
FIG. 4 is a diagram illustrating an example of New Radio (NR) vehicle-to-anything (V2X) communications coexisting with Long Term Evolution (LTE) V2X communications, in accordance with the present disclosure.

FIG. 4 is a diagram illustrating an example 400 of NR V2X communications coexisting with LTE V2X communications, in accordance with the present disclosure. Example 400 shows UEs in vehicles, including UE 402, UE 404, UE 406, and UE 408. UE 402 and UE 406 may operate using an LTE interface for LTE V2X communications, while UE 404 and UE 408 may use an NR interface or an NR V2X dual radio that is able to detect both an NR V2X control channel message (PSCCH carrying NR resource reservation information) with an NR interface and an LTE scheduling assignment (SA) (carrying LTE resource reservation information) with an LTE interface. A UE configured with an NR V2X dual radio, such as UE 404, may transmit a basic safety message (BSM) or a cooperative awareness message (CAM). UE 404 may also transmit advanced traffic information, such as a sensor sharing message. A UE configured with only an LTE interface, such as UE 402, may detect an LTE SA for autonomous resource reservation, but may not be able to decode NR resource reservation information to avoid collisions with NR reserved resources used by UE 404 or UE 408. This may be an issue when both LTE V2X and NR V2X coexist on the road before vehicles are uniformly fitted with NR V2X interfaces. Resource collisions may cause messages to be lost, which may introduce safety issues and cause UEs to waste processing resources and signaling resources.

As indicated above, FIG. 4 is provided as an example. Other examples may differ from what is described with regard to FIG. 4.

Figure 5:
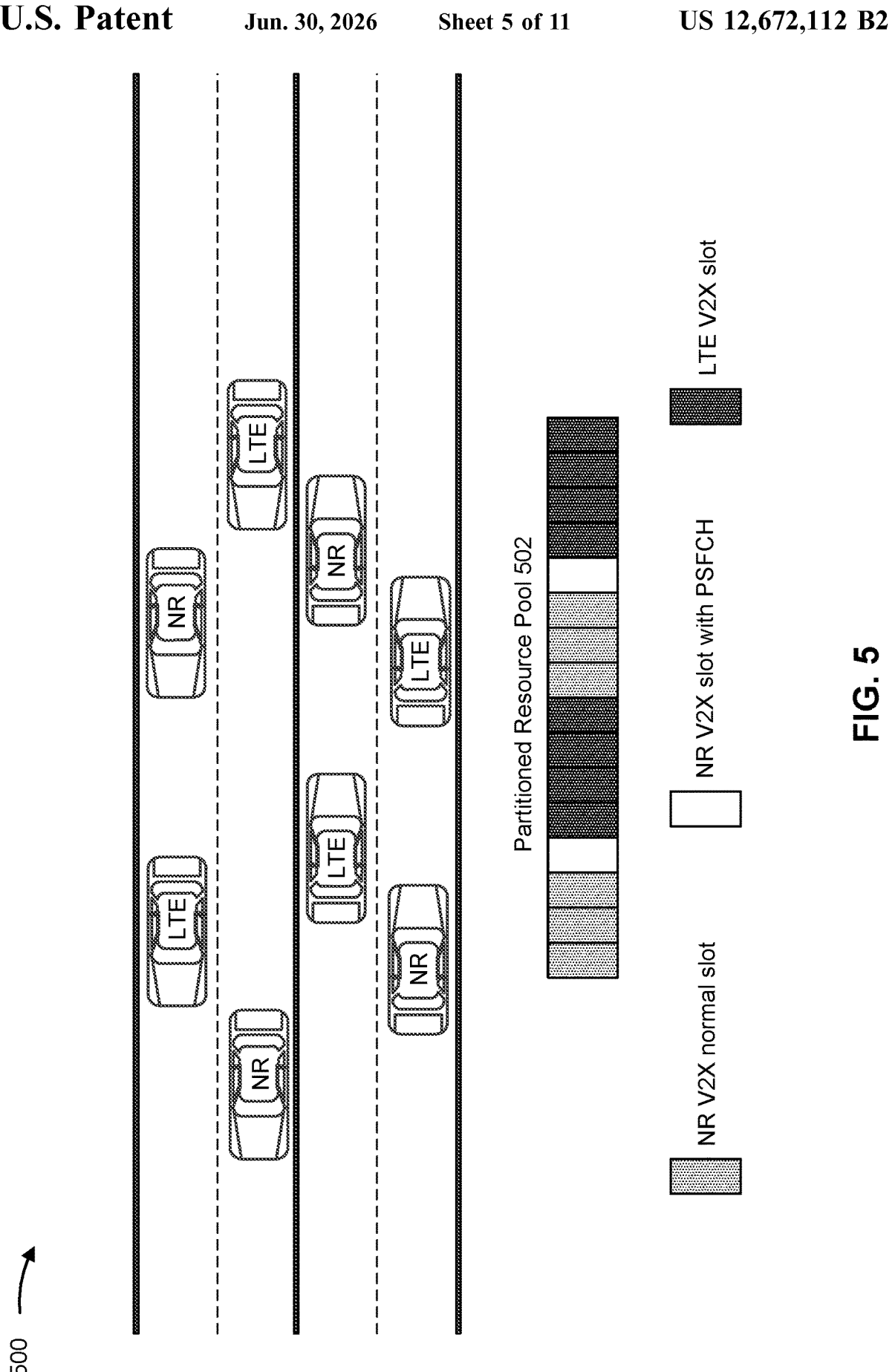
FIG. 5 is a diagram illustrating an example of a resource pool, in accordance with the present disclosure.

FIG. 5 is a diagram illustrating an example 500 of a resource pool, in accordance with the present disclosure. Example 500 shows vehicles with UEs that are equipped with LTE interfaces and UEs that are equipped with NR interfaces or NR dual radios.

UEs may use a resource pool frame structure for reserving resources for V2X communications when UEs with LTE interfaces coexist with UEs with NR interfaces. Resource coordination may help UEs to avoid V2X resource collisions. The resource pool frame structure may include a partition between NR V2X resources and LTE V2X resources. For example, partitioned resource pool 502 may include time division multiplexing (TDM) slots designated for NR V2X resources (normal slots) or NR V2X resources that are with a PSFCH. The partitioned resource pool 502 may also include slots designated for LTE V2X resources.

Multiple reserved resources may also be transmitted in a same slot using frequency division multiplexing (FDM). UEs configured with an NR interface may transmit LTE SA messages such that UEs configured with only an LTE interface may be aware of NR V2X resource reservation information. The use of a partitioned resource pool may be referred to as "resource pool protection."

In some aspects, how the partitioned resource pool 502 is partitioned may be determined based on an estimate of NR and LTE traffic loading, or an estimated penetration rate of NR V2X (e.g., a number of NR vehicles out of a total number of LTE and NR vehicles). For example, if an NR V2X penetration rate is estimated to be x % for a region, then x % of the partitioned resource pool 502 is allocated to NR V2X resources (in a TDM manner). The partitioned resource pool 502 shows an example of partitioned resources for NR and for LTE based on an estimated NR V2X penetration rate of 50%.

As indicated above, FIG. 5 is provided as an example. Other examples may differ from what is described with regard to FIG. 5.

Figure 6:
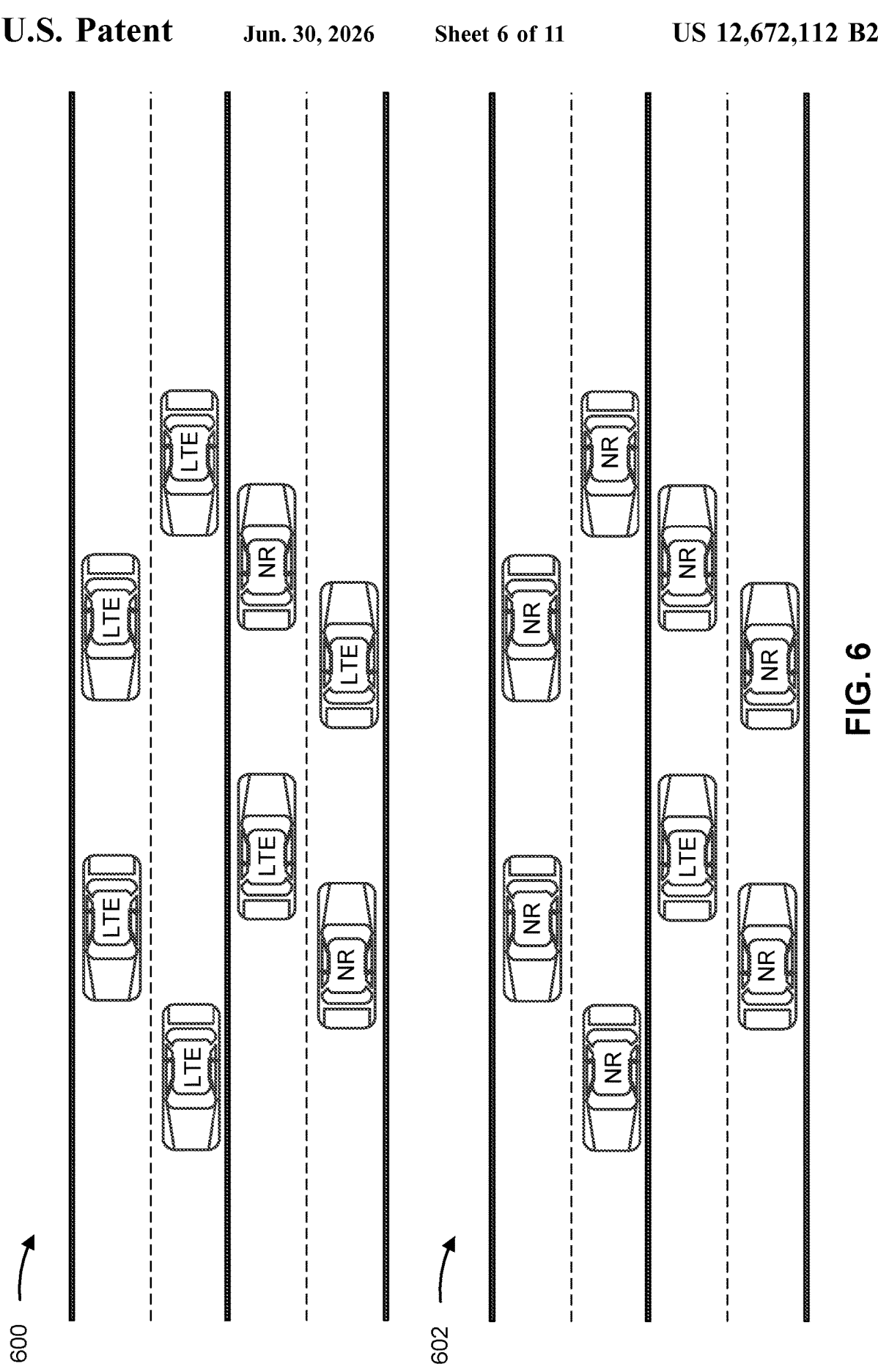
FIG. 6 is a diagram illustrating examples of NR V2X penetration rates, in accordance with the present disclosure.

FIG. 6 is a diagram illustrating examples 600, 602 of NR V2X penetration rates, in accordance with the present disclosure.

If the partitioning of the partitioned resource pool 502 depends on the NR V2X penetration rate, the partitioned resource pool 502 may benefit from a moderate actual NR V2X penetration rate, such as 50%. However, the NR V2X penetration rate may be low (e.g., lower than a threshold) or high (e.g., higher than a threshold). Example 600 shows 2 NR vehicles and 6 LTE vehicles. The NR V2X penetration rate may be low at 25%. Example 602 shows 6 NR vehicles and 2 LTE vehicles with a high NR V2X penetration rate of 75%.

If NR V2X traffic is low, an NR vehicle avoiding LTE V2X reservations may not be sufficient. LTE vehicles detecting LTE SA messages from NR vehicles may help LTE vehicles to avoid NR V2X resources used by NR vehicles, but if LTE SA messages are transmitted too often, NR vehicles may not have adequate resources for transmission. Resource pool protection during low NR V2X traffic may add significant half-duplex costs.

If NR V2X traffic is high, an LTE vehicle may use LTE V2X RSSI ranking to use V2X resources. RSSIs may indicate a percentage at which a V2X resource is available. A UE may select a V2X resource with a highest availability percentage. Higher ranked RSSIs indicate more availability. For a V2X resource selected by RSSI ranking, no NR V2X traffic may be used in the V2X resource. Resource pool protection during high NR V2X traffic may also add significant half-duplex costs.

As indicated above, FIG. 6 provides some examples. Other examples may differ from what is described with regard to FIG. 6.

Figure 7:
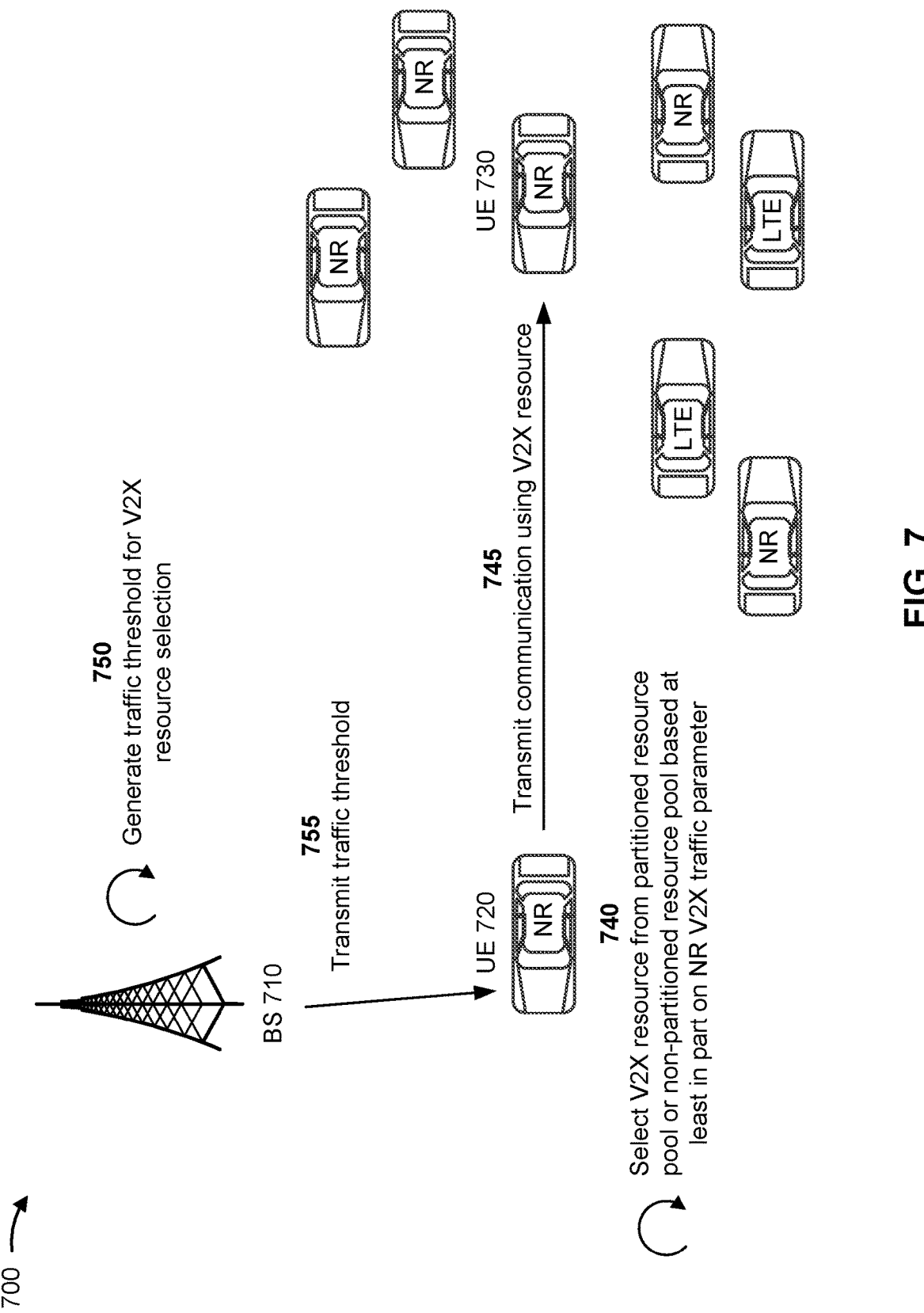
FIG. 7 is a diagram illustrating an example of adaptive resource pool protection, in accordance with the present disclosure.

FIG. 7 is a diagram illustrating an example 700 of adaptive resource pool protection, in accordance with the present disclosure. Example 700 shows a base station 710 that may communicate in a wireless network (e.g., wireless network 100) with a mobile station (UE 720) in a first vehicle, or with a mobile station (UE 730) in a second vehicle. UE 720 may communicate with UE 730 using V2X resources on a sidelink. UE 720 may include an NR interface or an NR dual radio. In example 700, UE 730 includes an NR interface, but UE 730 may also include an LTE interface.

According to various aspects described herein, UE 720 may use adaptive resource pool protection to maximize resource usage when NR vehicles coexist with LTE vehicles.

UE 720 may dynamically enable or disable resource pool protection based at least in part on traffic loading, such as if an NR V2X traffic parameter satisfies a traffic threshold. In some aspects, the NR V2X traffic parameter may include a CBR and the traffic threshold may include a minimum CBR, a maximum CBR, or one or more CBR ranges. The NR V2X traffic parameter may include an RSSI for NR V2X traffic, and the traffic threshold may include an RSSI percentage. The NR V2X traffic parameter may include a ratio of NR capability vehicles (e.g., quantity) or traffic (e.g., amount) with respect to LTE V2X vehicles or traffic, and the traffic threshold may be a maximum ratio or a minimum ratio. The NR V2X traffic parameter may include another traffic condition parameter or a combination of multiple parameters.

In some aspects, if an NR V2X traffic parameter does not satisfy the traffic parameter (e.g., NR V2X penetration is too high or too low), UE 720 may disable resource pool protection. That is, UE 720 does not select a V2X resource from the partitioned resource pool 502 (with partition between NR and LTE V2X resources) and selects a V2X resource from a nonpartitioned resource pool (resource pool with no partition to designate NR V2X resources and LTE V2X resources), which may be a default or designated resource pool for a channel. UE 720 may reserve a V2X resource from any V2X resources in the nonpartitioned resource pool. If the NR V2X traffic parameter does satisfy the NR V2X traffic parameter (e.g., NR V2X penetration is moderate, or not too high or too low), UE 720 may enable resource pool protection and select a V2X resource from the partitioned resource pool 502. If resource pool protection is enabled, NR and LTE vehicles may reserve V2X resources from separate resource pool sections, from either an NR section or an LTE section of the partitioned resource pool 502. UE 720 may broadcast resource reservations with a respective NR or LTE interface. NR vehicles may also transmit LTE SA messages to reserve resources, so that legacy LTE vehicles can detect reserved resources and avoid resource collisions. By dynamically disabling and enabling resource pool protection as part of an adaptive resource pool protection scheme, UE 720 and other UEs may conserve processing resources and signaling resources that would otherwise be wasted by collisions and retransmissions. Furthermore, vehicle and passenger safety may improve with less safety messages being lost to collisions.

Example 700 shows an example of adaptive resource pool protection. As shown by reference number 740, UE 720 may select a V2X resource from a partitioned resource pool (resource protection disabled) or a nonpartitioned resource pool (resource protection disabled) based at least in part on an NR V2X traffic parameter. In example 700, the NR V2X traffic parameter is a ratio of NR vehicles to LTE vehicles. UE 730 and other UEs transmit resource messages that indicate whether a UE is an NR vehicle (NR interface) or an LTE vehicle (LTE interface). UE 720 may detect or receive messages from surrounding vehicles and determine a quantity of NR vehicles with respect to LTE vehicles. In example 700, the ratio of NR vehicles (6 NR vehicles) to LTE vehicles (2 LTE vehicles) is 3:1. If a traffic threshold is to be a ratio of less than 3 vehicles to 1 LTE vehicle, UE 720 may determine that the traffic threshold (for resource pool protection) is not satisfied and may disable resource pool protection. UE 720 may thus select a V2X resource from a nonpartitioned resource pool. That is, UE 720 selects a V2X resource from any part of a designated resource pool, which is a resource pool that does not limit NR V2X resource selection to a limited portion of the resource pool. As a result, there are adequate NR V2X resources for UE 720 to use.

As shown by reference number 745, UE 720 may transmit a communication using the V2X resource that was selected from the nonpartitioned resource pool. UE 720 may transmit or broadcast a reservation of the V2X resource to the other NR vehicles, such that the other NR vehicles may use other V2X resources. In some aspects, UE 720 may transmit LTE SA messages that indicate the V2X resource to LTE vehicles (if resource pool protection is enabled). UE 720 may transmit the LTE SA messages with an NR interface using an LTE V2X waveform. In some aspects, co-channel operations involving resource pool protection may apply to scenarios where there are no separate spectrums for NR V2X or LTE V2X, respectively.

In some aspects, UE 720 may obtain traffic thresholds or types of traffic parameters from stored configuration information (designated by a standard). UE 720 may also follow a rule for selecting or determining a threshold based on a network configuration, traffic conditions, vehicle interface types, and/or a UE capability. In some aspects, UE 720 may obtain traffic thresholds or types of traffic parameters from base station 710. For example, as shown by reference number 750, base station 710 may generate a traffic threshold for V2X resource selection. For example, base station 710 may generate a new ratio for the traffic threshold based at least in part on traffic conditions, UE interface types (e.g., NR or LTE), and/or UE capabilities. As shown by reference number 755, base station 710 may transmit the traffic threshold to UE 720.

In some aspects, a traffic threshold may include a maximum CBR, a minimum CBR, or one or more CBR ranges. For example, UE 720 may enable resource pool protection if a measured CBR (e.g., self-measured) is greater than a minimum CBR and less than a maximum CBR. UE 720 may disable resource pool protection if the measured CBR is less than the CBR minimum or greater than the CBR maximum.

In some aspects, the traffic threshold may include an RSSI percentage. For example, if a maximum measured RSSI percentage (e.g., self-measured) on an NR resource portion is less than a percentile of a highest RSSI measured on all resources (NR resources too lightly occupied relative to the network), UE 720 may disable resource pool protection. If a minimum measured RSSI on an NR resource portion is greater than a percentile of a highest RSSI measured on all resources (NR resources are too heavily occupied), UE 720 may disable resource pool protection. If a measured RSSI falls into a middle range, UE 720 may enable resource pool protection.

In some aspects, the traffic threshold may include a ratio of NR vehicles or traffic to LTE vehicles or traffic. For example, UE 720 may enable resource pool protection if an NR vehicle to LTE vehicle ratio is greater than a minimum ratio and less than a maximum ratio. Otherwise, UE 720 may disable resource pool protection. In some embodiments, UE 720 may enable or disable resource pool protection based at least in part on any combination of a CBR measurement, an RSSI measurement, a ratio, NR penetration percentage, and/or a traffic loading estimate.

In some aspects, each UE may report an NR capability to other UEs or to base station 710. UEs may use a sensor sharing application. The base station 710 and/or UE 720 may use the NR capability information to derive a more accurate NR vehicle or traffic loading ratio. For example, base station 710 or UE 720 may calculate, using a traffic mapping model, a traffic loading ratio based at least in part on an NR V2X penetration rate, NR sensor sharing messages, a platooning message granularity, and/or a packet size estimation. Base station 710 or UE 720 may estimate a traffic volume based at least in part on a distributed congestion control (DCC) algorithm for LTE V2X BSM and/or NR V2X sensor sharing applications. By dynamically disabling or enabling resource pool protection, UEs may use V2X resources more efficiently while avoiding resource collisions.

As indicated above, FIG. 7 is provided as an example. Other examples may differ from what is described with regard to FIG. 7.

FIG. 8 is a diagram illustrating an example process 800 performed, for example, by a mobile station, in accordance with the present disclosure. Example process 800 is an example where the mobile station (e.g., UE 720) performs operations associated with selecting V2X resources.

As shown in FIG. 8, in some aspects, process 800 may include selecting a V2X resource from a resource pool partitioned between NR V2X resources and LTE V2X resources if an NR V2X traffic parameter does not satisfy a traffic threshold, or from a non-partitioned resource pool if the NR V2X traffic parameter satisfies the traffic threshold (block 810). For example, the mobile station (e.g., using communication manager 140 and/or selection component 1008 depicted in FIG. 10) may select a V2X resource from a resource pool partitioned between NR V2X resources and LTE V2X resources if an NR V2X traffic parameter does not satisfy a traffic threshold, or from a non-partitioned resource pool if the NR V2X traffic parameter satisfies the traffic threshold, as described above.

As further shown in FIG. 8, in some aspects, process 800 may include transmitting a V2X communication in the V2X resource (block 820). For example, the mobile station (e.g., using communication manager 140 and/or transmission component 1004 depicted in FIG. 10) may transmit a V2X communication in the V2X resource, as described above.

Process 800 may include additional aspects, such as any single aspect or any combination of aspects described below and/or in connection with one or more other processes described elsewhere herein.

In a first aspect, the NR V2X traffic parameter is a CBR and the traffic threshold is a minimum CBR or a maximum CBR.

In a second aspect, alone or in combination with the first aspect, the NR V2X traffic parameter is an RSSI for NR V2X traffic and the traffic threshold is an RSSI percentage.

In a third aspect, alone or in combination with one or more of the first and second aspects, the NR V2X traffic parameter is a ratio of NR capability vehicles or traffic with respect to LTE V2X vehicles or traffic and the traffic threshold is a maximum ratio or a minimum ratio.

In a fourth aspect, alone or in combination with one or more of the first through third aspects, the NR V2X traffic parameter is a combination of two or more of a CBR, an RSSI for NR V2X traffic, or a ratio of NR capability vehicles or traffic with respect to LTE V2X vehicles or traffic.

In a fifth aspect, alone or in combination with one or more of the first through fourth aspects, process 800 includes transmitting traffic parameter information.

In a sixth aspect, alone or in combination with one or more of the first through fifth aspects, process 800 includes receiving traffic parameter information.

In a seventh aspect, alone or in combination with one or more of the first through sixth aspects, process 800 includes transmitting an LTE V2X SA message that indicates the V2X resource.

In an eighth aspect, alone or in combination with one or more of the first through seventh aspects, process 800 includes receiving an LTE V2X SA message that indicates a V2X resource to be used by a mobile station of a neighboring vehicle, where selecting the V2X resource comprises selecting the V2X resource to avoid the V2X resource indicated by the mobile station of the neighboring vehicle.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a base station, in accordance with the present disclosure. Example process 900 is an example where the base station (e.g., base station 710) performs operations associated with providing traffic threshold for V2X resource selection.

As shown in FIG. 9, in some aspects, process 900 may include generating a traffic threshold that is to be used by a mobile station to select a V2X resource from a resource pool partitioned between NR V2X resources and LTE V2X resources if an NR V2X traffic parameter does not satisfy a traffic threshold, or from a non-partitioned resource pool if the NR V2X traffic parameter satisfies the traffic threshold (block 910). For example, the base station (e.g., using communication manager 150 and/or generation component 1108 depicted in FIG. 11) may generate a traffic threshold that is to be used by a mobile station to select a V2X resource from a resource pool partitioned between NR V2X resources and LTE V2X resources if an NR V2X traffic parameter does not satisfy the traffic threshold, or from a non-partitioned resource pool if the NR V2X traffic parameter satisfies the traffic threshold, as described above.

As further shown in FIG. 9, in some aspects, process 900 may include transmitting the traffic threshold to the mobile station (block 920). For example, the base station (e.g., using communication manager 150 and/or transmission component 1104 depicted in FIG. 11) may transmit the traffic threshold to the mobile station, as described above.

Process 900 may include additional aspects, such as any single aspect or any combination of aspects described below and/or in connection with one or more other processes described elsewhere herein.

In a first aspect, the traffic threshold is a minimum CBR or a maximum CBR.

In a second aspect, alone or in combination with the first aspect, the traffic threshold is an RSSI percentage for NR V2X traffic.

In a third aspect, alone or in combination with one or more of the first and second aspects, the traffic threshold is one or more of a maximum ratio or a minimum ratio of NR capability vehicles or traffic with respect to LTE V2X vehicles or traffic.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
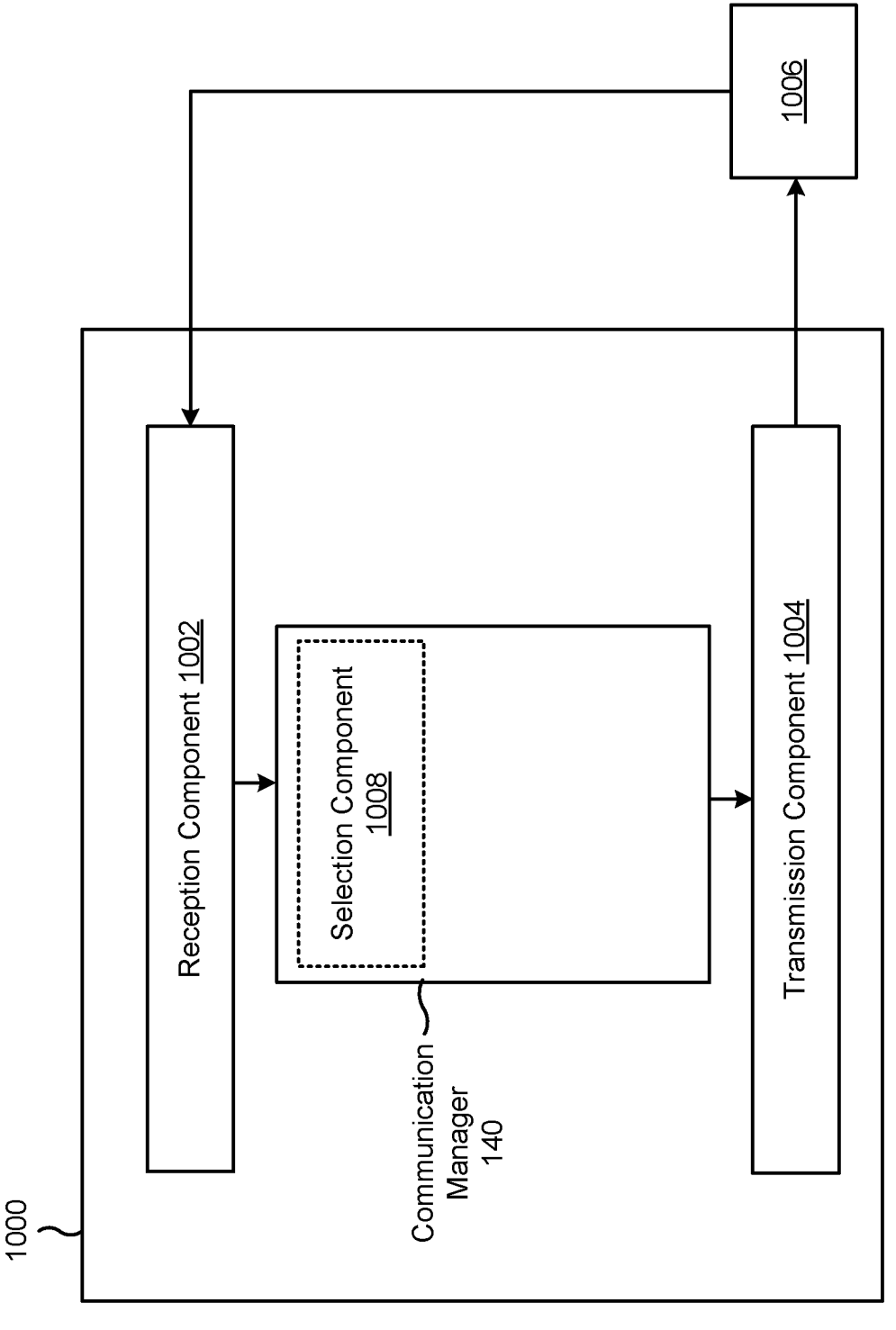
FIGS. 10-11 are diagrams of example apparatuses for wireless communication, in accordance with the present disclosure.

FIG. 10 is a diagram of an example apparatus 1000 for wireless communication. The apparatus 1000 may be a mobile station (e.g., UE 720), or a mobile station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a mobile station, a UE, a base station, or another wireless communication device) using the reception component 1002 and the transmission component 1004. As further shown, the apparatus 1000 may include the communication manager 140. The communication manager 140 may a selection component 1008, among other examples.

In some aspects, the apparatus 1000 may be configured to perform one or more operations described herein in connection with FIGS. 1-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the mobile station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the mobile station described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the mobile station described in connection with FIG. 2. In some aspects, the transmission component 1004 may be co-located with the reception component 1002 in a transceiver.

The selection component 1008 may select a V2X resource from a resource pool partitioned between NR V2X resources and LTE V2X resources if an NR V2X traffic parameter does not satisfy a traffic threshold, or from a non-partitioned resource pool if the NR V2X traffic parameter satisfies the traffic threshold. The transmission component 1004 may transmit a V2X communication in the V2X resource.

The transmission component 1004 may transmit traffic parameter information. The reception component 1002 may receive traffic parameter information.

The transmission component 1004 may transmit an LTE V2X scheduling assignment message that indicates the V2X resource. The reception component 1002 may receive an LTE V2X scheduling assignment message that indicates a V2X resource to be used by a mobile station of a neighboring vehicle, where selecting the V2X resource comprises selecting the V2X resource to avoid the V2X resource indicated by the mobile station of the neighboring vehicle.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
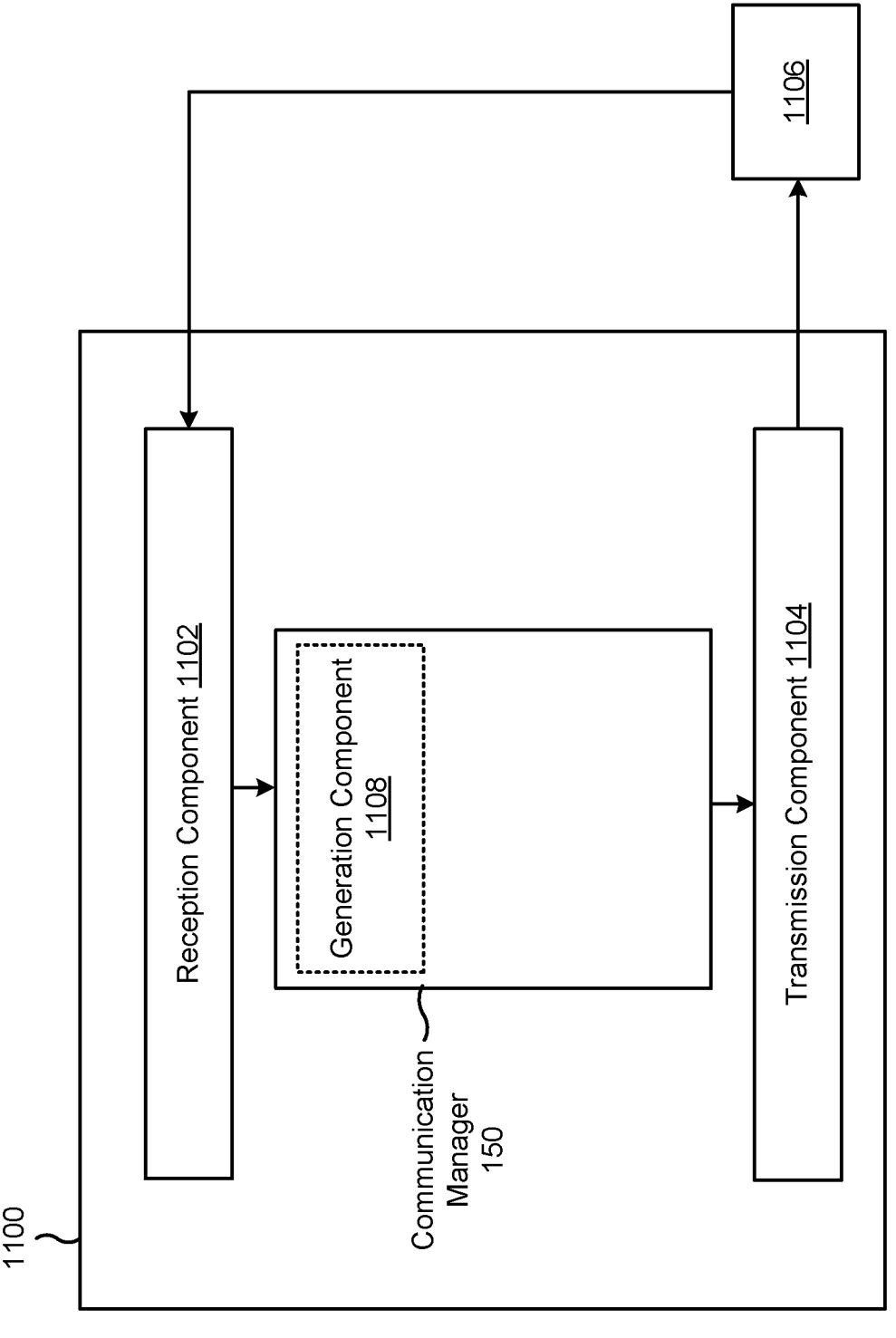

FIG. 11 is a diagram of an example apparatus 1100 for wireless communication. The apparatus 1100 may be a base station (e.g., base station 710), or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a generation component 1108, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The generation component 1108 may generate a traffic threshold that is to be used by a mobile station to select a V2X resource from a resource pool partitioned between NR V2X resources and LTE V2X resources if an NR V2X traffic parameter does not satisfy the traffic threshold, or from a non-partitioned resource pool if the NR V2X traffic parameter satisfies the traffic threshold. The transmission component 1104 may transmit the traffic threshold to the mobile station.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a mobile station, comprising: selecting, by the mobile station, a vehicle-to-anything (V2X) resource from a resource pool partitioned between New Radio (NR) V2X resources and Long Term Evolution (LTE) V2X resources if an NR V2X traffic parameter does not satisfy a traffic threshold, or from a non-partitioned resource pool if the NR V2X traffic parameter satisfies the traffic threshold; and transmitting, by the mobile station, a V2X communication in the V2X resource.

Aspect 2: The method of Aspect 1, wherein the NR V2X traffic parameter is a channel busy ratio (CBR) and the traffic threshold is a minimum CBR or a maximum CBR.

Aspect 3: The method of Aspect 1, wherein the NR V2X traffic parameter is a received signal strength indicator (RSSI) for NR V2X traffic and the traffic threshold is an RSSI percentage.

Aspect 4: The method of Aspect 1, wherein the NR V2X traffic parameter is a ratio of NR capability vehicles or traffic with respect to Long Term Evolution (LTE) V2X vehicles or traffic and the traffic threshold is a maximum ratio or a minimum ratio.

Aspect 5: The method of Aspect 1, wherein the NR V2X traffic parameter is a combination of two or more of a channel busy ratio, a received signal strength indicator for NR V2X traffic, or a ratio of NR capability vehicles or traffic with respect to Long Term Evolution (LTE) V2X vehicles or traffic.

Aspect 6: The method of any of Aspects 1-5, further comprising transmitting traffic parameter information.

Aspect 7: The method of any of Aspects 1-6, further comprising receiving traffic parameter information.

Aspect 8: The method of any of Aspects 1-7, further comprising transmitting a Long Term Evolution (LTE) V2X scheduling assignment message that indicates the V2X resource.

Aspect 9: The method of any of Aspects 1-8, further comprising receiving a Long Term Evolution (LTE) V2X scheduling assignment message that indicates a V2X resource to be used by a mobile station of a neighboring vehicle, wherein selecting the V2X resource comprises selecting the V2X resource to avoid the V2X resource indicated by the mobile station of the neighboring vehicle.

Aspect 10: A method of wireless communication performed by a base station, comprising: generating, by the base station, a traffic threshold that is to be used by a mobile station to select a vehicle-to-anything (V2X) resource from a resource pool partitioned between New Radio (NR) V2X resources and Long Term Evolution (LTE) V2X resources if an NR V2X traffic parameter does not satisfy the traffic threshold, or from a non-partitioned resource pool if the NR V2X traffic parameter satisfies the traffic threshold; and transmitting, by the base station, the traffic threshold to the mobile station.

Aspect 11: The method of Aspect 10, wherein the traffic threshold is a minimum CBR or a maximum CBR.

Aspect 12: The method of Aspect 10, wherein the traffic threshold is a received signal strength indicator percentage for NR V2X traffic.

Aspect 13: The method of Aspect 10, wherein the traffic threshold is one or more of a maximum ratio or a minimum ratio of NR capability vehicles or traffic with respect to Long Term Evolution (LTE) V2X vehicles or traffic.

Aspect 14: An apparatus for wireless communication at a device, comprising a processor; memory coupled with the processor; and instructions stored in the memory and executable by the processor to cause the apparatus to perform the method of one or more of Aspects 1-13.

Aspect 15: A device for wireless communication, comprising a memory and one or more processors coupled to the memory, the one or more processors configured to perform the method of one or more of Aspects 1-13.

Aspect 16: An apparatus for wireless communication, comprising at least one means for performing the method of one or more of Aspects 1-13.

Aspect 17: A non-transitory computer-readable medium storing code for wireless communication, the code comprising instructions executable by a processor to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A mobile station for wireless communication, comprising:
   one or more memories; and
   one or more processors, coupled to the one or more memories, configured to:
       select a vehicle-to-anything (V2X) resource from a resource pool partitioned between New Radio (NR) V2X resources and Long Term Evolution (LTE) V2X resources if an NR V2X traffic parameter does not satisfy a traffic threshold, or from a non-partitioned resource pool if the NR V2X traffic parameter satisfies the traffic threshold, wherein the NR V2X traffic parameter is a received signal strength indicator RSSI) for NR V2X traffic and the traffic threshold is an RSSI percentage; and
       transmit a V2X communication in the V2X resource.

2. The mobile station of claim 1, wherein the NR V2X traffic parameter is a channel busy ratio (CBR) and the traffic threshold is a minimum CBR or a maximum CBR.

3. The mobile station of claim 1, wherein the traffic threshold is a maximum ratio or a minimum ratio.

4. The mobile station of claim 1, wherein the one or more processors are configured to transmit traffic parameter information.

5. The mobile station of claim 1, wherein the one or more processors are configured to receive traffic parameter information.

6. The mobile station of claim 1, wherein the one or more processors are configured to transmit a Long Term Evolution (LTE) V2X scheduling assignment message that indicates the V2X resource.

7. The mobile station of claim 1, wherein the one or more processors are configured to receive a Long Term Evolution (LTE) V2X scheduling assignment message that indicates a V2X resource to be used by a mobile station of a neighboring vehicle, and wherein the one or more processors, to select the V2X resource, are configured to select the V2X resource to avoid the V2X resource indicated by the mobile station of the neighboring vehicle.

8. A network entity for wireless communication, comprising:
   one or more memories; and
   one or more processors, coupled to the one or more memories, configured to:
       generate a traffic threshold that is to be used by a mobile station to select a vehicle-to-anything (V2X) resource from a resource pool partitioned between New Radio (NR) V2X resources and Long Term Evolution (LTE) V2X resources if an NR V2X traffic parameter does not satisfy the traffic threshold, or from a non-partitioned resource pool if the NR V2X traffic parameter satisfies the traffic threshold, wherein the NR V2X traffic parameter is a received signal strength indicator (RSSI) for NR V2X traffic and the traffic threshold is an RSSI percentage; and transmit the traffic threshold to the mobile station.

9. The network entity of claim 8, wherein the traffic threshold is a minimum CBR or a maximum CBR.

10. The network entity of claim 8, wherein the traffic threshold is a maximum ratio or a minimum ratio.

11. The network entity of claim 8, wherein the one or more processors are configured to transmit traffic parameter information.

12. The network entity of claim 8, wherein the one or more processors are configured to receive traffic parameter information.

13. The network entity of claim 8, wherein the one or more processors are configured to receive a Long Term Evolution (LTE) V2X scheduling assignment message that indicates the V2X resource.

14. The network entity of claim 8, wherein the one or more processors are configured to transmit a Long Term Evolution (LTE) V2X scheduling assignment message that indicates a V2X resource to be used by a mobile station of a neighboring vehicle.

15. A method of wireless communication performed by a mobile station, comprising:

selecting, by the mobile station, a vehicle-to-anything (V2X) resource from a resource pool partitioned between New Radio (NR) V2X resources and Long Term Evolution (LTE) V2X resources if an NR V2X traffic parameter does not satisfy a traffic threshold, or from a non-partitioned resource pool if the NR V2X traffic parameter satisfies the traffic threshold, wherein the NR V2X traffic parameter is a received signal strength indicator (RSSI) for NR V2X traffic and the traffic threshold is an RSSI percentage; and transmitting, by the mobile station, a V2X communication in the V2X resource.

16. The method of claim 15, wherein the NR V2X traffic parameter is a channel busy ratio (CBR) and the traffic threshold is a minimum CBR or a maximum CBR.

17. The method of claim 15, wherein the traffic threshold is a maximum ratio or a minimum ratio.

18. The method of claim 15, further comprising transmitting traffic parameter information.

19. The method of claim 15, further comprising receiving traffic parameter information.

20. The method of claim 15, further comprising transmitting a Long Term Evolution (LTE) V2X scheduling assignment message that indicates the V2X resource.

21. The method of claim 15, further comprising receiving a Long Term Evolution (LTE) V2X scheduling assignment message that indicates a V2X resource to be used by a mobile station of a neighboring vehicle, wherein selecting the V2X resource comprises selecting the V2X resource to avoid the V2X resource indicated by the mobile station of the neighboring vehicle.

22. A method of wireless communication performed by a network entity, comprising:

generating, by the network entity, a traffic threshold that is to be used by a mobile station to select a vehicle-to-anything (V2X) resource from a resource pool partitioned between New Radio (NR) V2X resources and Long Term Evolution (LTE) V2X resources if an NR V2X traffic parameter does not satisfy the traffic threshold, or from a non-partitioned resource pool if the NR V2X traffic parameter satisfies the traffic threshold, wherein the NR V2X traffic parameter is a received signal strength indicator (RSSI) for NR V2X traffic and the traffic threshold is an RSSI percentage; and transmitting, by the network entity, the traffic threshold to the mobile station.

23. The method of claim 22, wherein the traffic threshold is a minimum CBR or a maximum CBR.

24. The method of claim 22, wherein the traffic threshold is a maximum ratio or a minimum ratio.

25. The method of claim 22, further comprising:

receiving a Long Term Evolution (LTE) V2X scheduling assignment message that indicates the V2X resource.

26. The method of claim 22, further comprising:

transmitting a Long Term Evolution (LTE) V2X scheduling assignment message that indicates a V2X resource to be used by a mobile station of a neighboring vehicle.

* * * * *